March 3, 1959
D. P. A. HOUDART
2,876,035
EXPANSIBLE VEHICLE
Filed Aug. 2, 1956
2 Sheets-Sheet 1
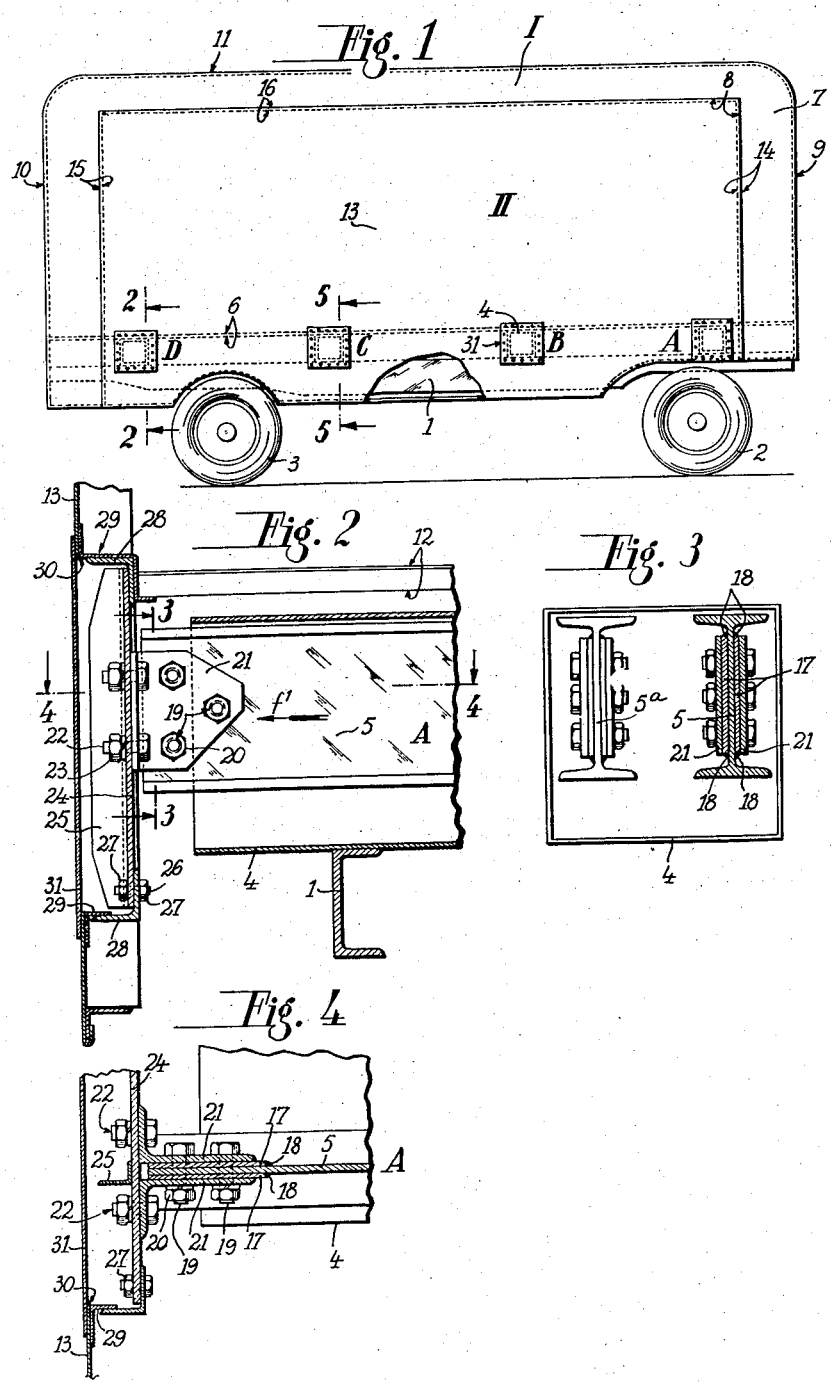

March 3, 1959  D. P. A. HOUDART  2,876,035
EXPANSIBLE VEHICLE
Filed Aug. 2, 1956  2 Sheets-Sheet 2
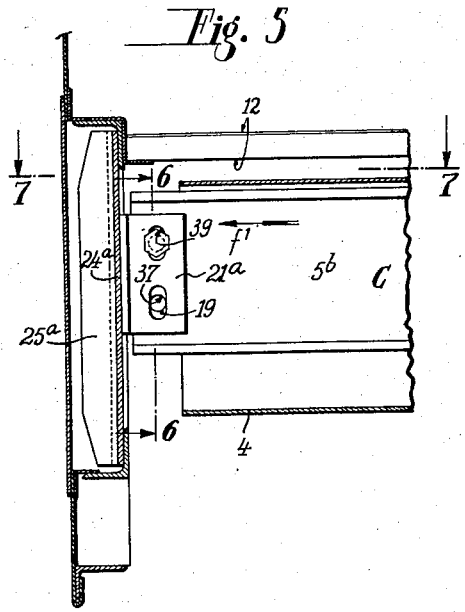
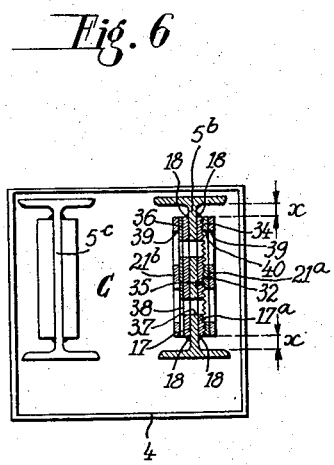
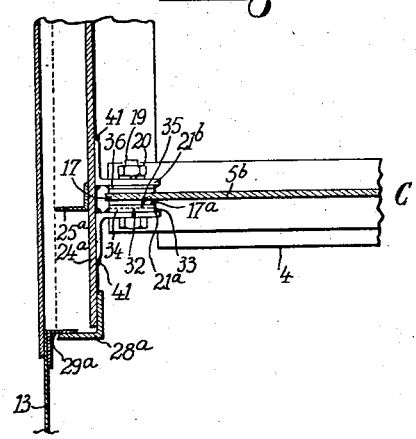

United States Patent Office 2,876,035
Patented Mar. 3, 1959

2,876,035

EXPANSIBLE VEHICLE

Dominique Paul Albert Houdart, Dijon, France, assignor to Etablissements Deplirex, Dijon, France, a corporation of France Application August 2, 1956, Serial No. 601,789

Claims priority, application France October 10, 1955

4 Claims. (Cl. 296—26)

This invention relates to motor vehicles and more particularly to trailers which can be extended or expanded and the bodies of which are provided with at least one portion movable in relation to a fixed portion with which it constitutes a telescopic assembly. In such mechanisms the operation of extending and retracting the moving portion can be performed by means of a series of mechanisms, which may include, for example, a casing having the shape of an elongated box which is placed transversely between the chassis of the vehicle and the fixed body portion, and wherein are slidably mounted, for each moving portion, respectively, one elongated member securely fastened to the moving portion and, furthermore, coupled to a control mechanism enabling the movement of the member inside the box.

If the motor vehicle has a sturdy framework with strong side members, capable of supporting heavy loads without substantial bending, the problem of fastening the moving members of the several boxes to the moving portions of the body does not encounter difficulty. However, difficulties are encountered with vehicles of smaller weight, such as trailers, wherein the side members, which have less strength because of the necessary reduction in the weight of the chassis, will bend in varying degrees in accordance with the load.

A bending or curving of the side members may possibly not create difficulty where the trailer construction is provided for a given permanent load, because in this event, it will suffice to join the moving body part to the moving members of the boxes after the load to be transported, or the equivalent thereof, has been placed on the vehicle floor. However, the problem is quite different if the vehicle is to be used for a given load and a different load is placed thereon such as for example is the case with mass-produced vehicles where no exact consideration is given to the load which is to be sustained.

In this case, after the moving members of the boxes are attached securely to the moving body portion, the bending of the side members under certain load will be such that the extending and retracting of the moving body portion will be hampered or made quite difficult due to jamming or frictional stresses caused by the relative lowering of the boxes.

An object of the invention is to eliminate this drawback by providing an expansible vehicle of the aforedescribed type, with a lightweight construction, and more particularly a trailer having side members that are capable of enduring great variations of a sag under differing loads.

In accordance with the invention, such a vehicle is mainly characterized in that the moving members of at least some of the unfolding mechanisms are adjustably attached to the moving body portion and by means of such an adjustable coupling the apparatus can be adapted for any sag to which the side members are subjected under the weight of a given load.

Preferably, in a body with transversely moving portions, the moving members of the two outside, front and rear mechanisms, respectvely, are rigidly attached to the moving body portion, whereas the moving members of the intermediate mechanisms are adjustably fastened to such body portions, or vice versa.

Other objects and structural details of the invention will be apparent from the following description when read in conjunction with the accompanying drawings showing preferred embodiments of the invention, wherein:

Fig. 1 is a diagrammatical side elevational view of an improved trailer according to the invention, Fig. 2 is a vertical sectional view along line 2—2 of Fig. 1, showing the rigid attachment of a moving member of the rear control mechanism to the moving body portion, Fig. 3 is a sectional view along line 3—3 of Fig. 2, Fig. 4 is a horizontal sectional view according to line 4—4 of Fig. 2, Fig. 5 is a vertical sectional view according to line 5—5 of Fig. 1, showing the adjustable attachment of a moving member of one intermediate control mechanism, Fig. 6 is a vertical sectional view along line 6—6 of Fig. 5, and Fig. 7 is a horizontal sectional view along line 7—7 of Fig. 5.

Referring now to the apparatus illustrated by the drawings, the invention is shown in connection with a trailer coupled to a motor vehicle at the right end thereof (not shown). The trailer is provided with a framework including the two side members 1 resting over suspensions and axles (not shown) on two wheel assemblies 2 and 3. The side members 1 have a comparatively light weight and may sustain substantial stresses produced by loads to be carried by the trailer.

Transversely on the side members 1 are fastened four mechanisms A, B, C and D of a known type, designed for the extending or unfolding and retracting or withdrawing in inverse directions of the two moving portions of the body. Each of these mechanisms is provided with a casing or box 4 (Figs. 2 to 7) of a rectangular cross section, which is placed between the side members 1 and the trailer body.

In each of the boxes 4 move longitudinally thereto (i. e., transversely to the longitudinal axis of the trailer) two moving members consisting of two iron bars 5 and 5a, respectively (Figs. 2 to 4) with an I-shaped or double-T-shaped cross section, where mechanisms A and D are concerned, and members 5b—5c, respectively, in the case of mechanisms B and C (Figs. 5 to 7). Members 5 and 5b slide in the direction of arrows $f^1$, as shown in Figs. 2 and 5 (that is, toward the right side of the trailer) whereas members 5a and 5c move in the opposite direction (i. e., toward the left trailer side).

The body resting on mechanisms A to D has a fixed center portion I and two side portions, whereof only one, to wit, II, can be seen in the drawing, it being so designed as to extend on the trailer's right side, while the other moving portion unfolds symmetrically on the trailer's left side.

Fixed portion I is provided with floor 6 (cf. Fig. 1), resting on the boxes 4, two longitudinal, lateral walls 7, each having a large, rectangular opening 8 for the passage of the corresponding moving portion II, two transverse, front and rear walls 9 and 10, respectively, and a roof 11.

Each moving portion II is likewise provided with a floor 12 (Figs. 2 and 5), whereof the upper surface constitutes, in the unfolded position, an extension of the upper surface of floor 6 of fixed portion I an outside longitudinal wall 13, two transverse end walls 14 and 15, respectively, and a roof 16.

The above described assembly is known and is improved as follows: In lieu of longitudinal vertical wall 13 of each respective moving portion II being securely, or, at least non-adjustably attached to the corresponding members 5, 5b and 5a, 5c, respectively, of the expansion mechanisms A to D, the fastening of the (moving) members of intermediate mechanisms B and C according to the invention differs from the fixation of the members of the outside mechanisms A and D.

In each of the outside mechanisms A and D, the attachment is non-adjustable, and is carried into effect as shown in Figs. 2 to 4. Member 5 (or 5a) is provided, at the end thereof projecting from box 4, with two lining plates 17 joined to the member 5 by welding at 18. To the unit 5–17 are rigidly fastened, by means of nuts 20 and bolts 19, which pass through circular holes, two angle irons 21.

To the angle irons 21 is similarly attached a plate 24 by means of bolts 22 and nuts 23 engaging borings in the plate 24 coresponding to borings in the associated wings of the angle irons 21, through which are passed the bolts 22. The plate 24, which, preferably, is reinforced by a flange consisting of angle iron 25 welded to the plate 24, is non-adjustably fastened by means of the bolts 26 and nuts 27 to angle irons 28 which are secured by means of a frame 29 to the outside wall 13. The wall 13 is provided, in front of plate 24 and of frame 29, with an opening 30, through which the plate 24 and the nuts 23 and 27 may be reached, so as to permit the unfastening of this wall 13 from the mechanism A or D, respectively. As a rule, after the assembly is completed, the opening 30 is covered by a plate 31 which is secured in known manner.

On the other hand, each of the portions II is adjustably attached to intermediate mechanisms B and C, for example, by means of the construction as shown in Figs. 5 to 7. Each member 5b and 5c is provided with two lining plates 17 and 17a which are welded at 18 to the corresponding member 5. However, while both surfaces of the lining 17 are smooth, lining 17a has a smooth surface on the one side where it is joined to the core of the member 5, but is provided with horizontal grooves 32 on its outside surface.

Furthermore, to one of the angle irons 21a is welded at 33 a plate 34, whose unattached side is provided with grooves 35 corresponding to the grooves 32 of lining 17a and cooperating therewith.

A detachable block or wedge 36, with smooth surfaces, completes the unit, the block 36 being inserted between the core of member 5b and the other angle iron 21b.

Moreover, for the passage of fastening bolts 19, the borings 37, facing each other, are provided in the core of member 5b, in the two linings 17 and 17a, and boring 38 in block 36, while the two angle irons 21a and 21b, and plate 34 which is fastened to the angle iron 21a are provided with oval-shaped borings 39 and 40, whereof the longer axes are disposed vertically, i. e., perpendicularly to grooves 32 and 35.

The two angle irons 21a and 21b are welded at 41 to a plate 24a, this plate being reinforced by an angle iron 25a and being secured by means of angle irons 28a and frames 29a to the outside wall 13 of the respective moving portion II.

It can be seen that by means of this arrangement, at the time of the building of the vehicle and before a load had been placed on the trailer, each moving portion II may be attached to the mechanisms A, B, C and D without concern for the load, mechanisms A and D being permanently attached as shown in Figs. 2 to 4, whereas the intermediate mechanisms B and C are respectively connected to each portion II (for example, in the center position as shown in Figs. 5 to 7) when all grooves 35 of plate 34 mesh with the grooves of lining 17a, and bolts 19 pass through openings 39 and 40 at the center of their vertical axis.

When a final load (such as, for example, the furnishings for a trailer) is thereafter placed in the trailer, the side members will bend. This, however, will produce no difficulty if, prior to the loading, nuts 20 of mechanisms B and C have been loosened, because bolts 19 being pressed downward, together with the corresponding member 5b and linings 17 and 17a through the bending of frame side members 1, will slide in borings 39 and 40 of angle irons 21a and 21b and of plate 34 which remain at the same elevation, inasmuch as they are connected to the corresponding body portion II which will be itself kept at the same elevation by means of the two end mechanisms A and D. While the aforedescribed downward motion takes place, the grooves 32 of lining 17a will glide over grooves 35 of plate 34 provided that the nuts 20 have been loosened at least to the extent of the depth of these grooves.

After the trailer is loaded and side members 1 have adopted their final sagging position, angle irons 21a and 21b may be locked in their position in relation to member 5b which they now will occupy, by the simple tightening of nuts 20, whereby a substantial number of grooves 35 of plate 34 will penetrate into the cooperating grooves 32 of lining 17a. Plate 34 will simply project some length upward from lining 17a. It will be understood that the greatest possible sag of the side members 1 in this case will be the distance $x$ (Fig. 6) separating, from a center position of the assembly, angle iron 21a and plate 34 fastened thereto from the bottom side of the upper wing of member 5b. Nevertheless, this maximum sag can be increased to twice the distance $x$ if, when the trailer is empty, angle irons 21a are secured to moving body portion II in such a way that said angle irons touch the upper sides of the bottom wings of member 5b.

It will be readily understood that, after the adjustment is applied, the fastening of each respective moving portion II to mechanisms A, B, C and D will not create any abnormal stresses, and members 5, 5a, 5b and 5c will slide easily which under many circumstances is not the case with heavy loads and relatively weak side members 1 if the attachment of the moving parts to the unfolding mechanisms is made non-adjustable.

It is understood that the invention is in no way limited to the described and shown embodiment thereof, it merely being of exemplary value. Thus, the outside mechanisms A and D may be mounted adjustably, while the intermediate mechanisms are rigidly secured; or, further, all mechanisms can be adjustably attached.

What is claimed is:

1. An expansible body mechanism for vehicles comprising a fixed portion, a movable portion extendible from said fixed portion in a predetermined direction, said movable portion being capable of a different deflection under load than said fixed portion; a load support; a plurality of members fixed transversely to said fixed portion and adapted to be fixed on said load support, said load support extending transversely to said members and being capable of bending under the weight of a load, a support and control mechanism in each of said members, each of said mechanisms comprising a supporting and controlling girder having its axis parallel to said direction and being displaceable along its axis; and attachment means on the outer end of each of said girders to connect said end to said movable portion, at least one of said attachment means being adjustable in height with respect to the girder with a load applied on said load carrier, whereby the difference of deflection between said fixed portion and said movable portion is compensated for by adjustment of said attachment means free of obstruction of the movements of said mechanisms.

2. An expansible body mechanism for vehicles comprising a fixed portion, a movable portion extendible from said fixed portion in a predetermined direction, said movable portion being capable of a different deflection under load than said fixed portion; a load support; a plurality of members fixed transversely to said fixed portion and adapted to be fixed on said load support, said load support extending transversely to said members and being capable of bending under the weight of a load, a support and control mechanism in each of said members, each of said mechanisms comprising a supporting and controlling girder having its axis parallel to said direction and being displaceable along its axis; and attachment means on the outer end of each of said girders to connect said end to said movable portion, at least one of said attachment means being adjustable in height with respect to the girder with a load applied on said load carrier, whereby the difference of deflection between said fixed portion and said movable portion is compensated for by adjustment of said attachment means free of obstruction of the movements of said mechanisms; the girders associated with the outermost of said members being rigidly connected to said movable portion and the remainder of said girders being connected by said attachment means to said movable portion.

3. An expansible body mechanism for vehicles comprising a fixed portion, a movable portion extendible from said fixed portion in a predetermined direction, said movable portion being capable of a different deflection under load than said fixed portion; a load support; a plurality of members fixed transversely to said fixed portion and adapted to be fixed on said load support, said load support extending transversely to said members and being capable of bending under the weight of a load, a support and control mechanism in each of said members, each of said mechanisms comprising a supporting and controlling girder having its axis parallel to said direction and being displaceable along its axis; and attachment means on the outer end of each of said girders to connect said end to said movable portion, at least one of said attachment means being adjustable in height with respect to the girder with a load applied on said load carrier, whereby the difference of deflection between said fixed portion and said movable portion is compensated for by adjustment of said attachment means free of obstruction of the movements of said mechanisms; the girders associated with the outermost of said members being rigidly connected to said movable portion and the remainder of said girders being connected by said attachment means to said movable portion; said attachment means comprising a plurality of pairs of mating grooved members connected intermediate said remainder of the girders and the movable portion, each pair defining at least one elongated slot, bolts for securing the grooved members of each pair together and on said remainder of the girders, said bolts being accommodated in the slots for mutual adjustment of the grooved members of each pair, each pair of grooved members defining corresponding and mating grooves for the mutual inter-engagement of the grooved members, and an angle fixable relative to at least one of the grooved members of each pair and connected to the movable portion.

4. An expansible body mechanism for vehicles comprising a fixed portion, a movable portion extendible from said fixed portion in a predetermined direction, said movable portion being capable of a different deflection under load than said fixed portion; a load support; a plurality of members fixed transversely to said fixed portion and adapted to be fixed on said load support, said load support extending transversely to said members and being capable of bending under the weight of a load, a support and control mechanism in each of said members, each of said mechanisms comprising a supporting and controlling girder having its axis parallel to said direction and being displaceable along its axis; and attachment means on the outer end of each of said girders to connect said end to said movable portion, at least one of said attachment means being adjustable in height with respect to the girder with a load applied on said load carrier, whereby the difference of deflection between said fixed portion and said movable portion is compensated for by adjustment of said attachment means free of obstruction of the movements of said mechanisms; the girders associated with the outermost of said members being rigidly connected to said movable portion and the remainder of said girders being connected by said attachment means to said movable portion; said attachment means comprising a plurality of pairs of mating grooved members connected intermediate said remainder of the girders and the movable portion, each pair defining at least one elongated slot, bolts for securing the grooved members of each pair together and on said remainder of the girders, said bolts being accommodated in the slots for mutual adjustment of the grooved members of each pair, each pair of grooved members defining corresponding and mating grooves for the mutual inter-engagement of the grooved members, and an angle fixable relative to at least one of the grooved members of each pair and connected to the movable portion; said body mechanism further comprising a plate, bolts affixing said plate to the angles, further angles on said plate for supporting said movable body portion and spacing it from said plate, said movable body portion defining an aperture permitting access to said plate and bolts, and a cover detachably covering the aperture.

References Cited in the file of this patent
UNITED STATES PATENTS

| | | |
|---|---|---|
| 1,729,580 | Hitt | Sept. 24, 1929 |
| 1,964,894 | Rohne | July 3, 1934 |
| 2,027,888 | Solomon | Jan. 14, 1936 |
| 2,177,394 | Pierce | Oct. 24, 1939 |
| 2,656,216 | Bobroff | Oct. 20, 1953 |

FOREIGN PATENTS

| | | |
|---|---|---|
| 679,285 | Great Britain | Sept. 17, 1952 |